US009632855B2

(12) United States Patent
Jung et al.

(10) Patent No.: US 9,632,855 B2
(45) Date of Patent: Apr. 25, 2017

(54) METHOD AND APPARATUS FOR CONTROLLING WATCHDOG

(71) Applicant: Hyundai Motor Company, Seoul (KR)

(72) Inventors: Ui Jung Jung, Gyeonggi-do (KR); Ji Yong Park, Chungcheongnam-do (KR); Young Il Na, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 250 days.

(21) Appl. No.: 14/622,839

(22) Filed: Feb. 14, 2015

(65) Prior Publication Data

US 2016/0132378 A1    May 12, 2016

(30) Foreign Application Priority Data

Nov. 12, 2014    (KR) .................. 10-2014-0157074

(51) Int. Cl.
*G06F 11/00* (2006.01)
*G06F 11/07* (2006.01)

(52) U.S. Cl.
CPC ...... *G06F 11/0757* (2013.01); *G06F 11/0739* (2013.01)

(58) Field of Classification Search
CPC .................. G06F 11/0757; G06F 11/0739
See application file for complete search history.

(56) References Cited

U.S. PATENT DOCUMENTS

| 2009/0204856 | A1* | 8/2009 | Sinclair | G06F 11/0778 |
| | | | | 714/48 |
| 2013/0227333 | A1* | 8/2013 | Furukoshi | G06F 11/0757 |
| | | | | 714/2 |
| 2014/0082434 | A1* | 3/2014 | Knight | G05B 19/0428 |
| | | | | 714/55 |

FOREIGN PATENT DOCUMENTS

| JP | 2007-185998 A | 7/2007 |
| JP | 2008-059649 A | 3/2008 |
| JP | 2008-225807 A | 9/2008 |
| JP | 2009-003592 A | 1/2009 |
| KR | 10-0311366 B1 | 9/2001 |
| KR | 10-2003-0049442 A | 6/2003 |
| KR | 10-2004-0085974 A | 10/2004 |
| KR | 10-0953510 B1 | 4/2010 |

(Continued)

OTHER PUBLICATIONS

Won-Cheol Heo, Machine Translation of Korean Application 10-2003-0020845, 11 pages.*

*Primary Examiner* — Jason Bryan
(74) *Attorney, Agent, or Firm* — Mintz Levin Cohn Ferris Glovsky and Popeo, P.C.; Peter F. Corless

(57) ABSTRACT

A method of controlling a watchdog and an apparatus for the same are provided. The method of controlling a watchdog within a controller includes determining, by a processor, whether to respond to a fault in the controller by comparing a watchdog count with a predetermined watchdog warning level when the fault is detected. Further, the method includes storing, by the processor, information regarding a program group related to the detected fault and a watchdog reset count that corresponds to the program group within a memory after increasing the watchdog reset count when the fault is to be responded to. In addition the processor is configured to reset the controller when the watchdog count exceeds a predetermined watchdog timeout level. Therefore, the present invention prevents occurrence of repeated resets that result from the same cause within the controller.

20 Claims, 10 Drawing Sheets

(56) References Cited

FOREIGN PATENT DOCUMENTS

KR     10-0978713 B1    8/2010
KR     10-1449274 B1    10/2014

* cited by examiner

FIG. 6

| PROGRAM GROUP | TASK | WATCHDOG RESET COUNT (WatchdogRstCnt) |
|---|---|---|
| Group A | None | 0 |
| Group B | Task 6 | 4 |
| Group C | None | 0 |

METHOD AND APPARATUS FOR CONTROLLING WATCHDOG

CROSS-REFERENCE TO RELATED APPLICATION(S)

This application claims the benefit of Korean Patent Application No. 10-2014-0157074, filed on Nov. 12, 2014, which is hereby incorporated by reference as if fully set forth herein.

BACKGROUND

Field of the Invention

The present invention relates to a method and apparatus for controlling a watchdog, and more particularly, to a method of controlling a watchdog to more safely respond to repeated watchdog resets and an apparatus for the same.

Discussion of the Related Art

A watchdog within a microcomputer refers to an operation of monitoring to detect when an operation is suspended due to a system failure or an infinite loop is entered due to a software error. A watchdog timer refers to an apparatus that performs a particular operation (e.g., a system reset operation when a system response does not occur for a preset period of time).

An embedded system, such as a vehicle controller, requires an ability to restore an error. In general, when an error occurs in the embedded system, a watchdog apparatus is configured to reboot the system to restore the system to a normal operation. For example, a related art discloses a technology for using various watchdog timers to respond to an error in hardware or software of a controller and storing reset information within a memory to identify the reset information. However, a conventional scheme of controlling a watchdog merely discloses a procedure of rebooting a system based on a watchdog timer, and may fail to fundamentally resolve a cause of an error that occurs in the system.

SUMMARY

Accordingly, the present invention may provide a safer method of controlling a watchdog and an apparatus for the same. The present invention provides a method of controlling a watchdog capable of more safely preventing occurrence of repeated resets and an apparatus for the same by recording information regarding a program group that incurs a fault and the number of resets incurred by the program group within a non-volatile memory and that excludes the program group from scheduling targets based on the number of resets during system restart when the system restart is required due to expiration of a watchdog timer. Further, the present invention provides a method of controlling a watchdog to prevent occurrence of repeated resets that result from the same cause and an apparatus for the same by recording task identification information that identifies a task that incurs a fault within a non-volatile memory and loading a substitute program that corresponds to the recorded task identification information during a system restart when the system restart is necessary due to expiration of a watchdog timer.

Additional advantages, objects, and features of the invention will be set forth in part in the description which follows and in part will become apparent to those skilled in the art upon examination of the following or may be learned from practice of the invention. The objectives and other advantages of the invention may be realized and attained by the structure particularly pointed out in the written description and claims hereof as well as the appended drawings.

According to an exemplary embodiment of the present invention, a method of controlling a watchdog within a controller may include determining, by a processor, whether to respond to a fault within the controller by comparing a watchdog count with a predetermined watchdog warning level when the fault is detected; storing, by the processor, information regarding a program group related to the detected fault and a watchdog reset count that corresponds to the program group within a memory after increasing the watchdog reset count when the fault is to be responded to; and resetting, by the processor, the controller when the watchdog count exceeds (e.g., is greater than) a predetermined watchdog timeout level.

In particular, the program group may be excluded from scheduling targets when the watchdog reset count reaches a predetermined maximum reset count. In addition, the fault may be detected when the watchdog count exceeds a predetermined watchdog count clear level. The method may further include identifying, by the processor, a task that incurs the fault in the program group and storing, by the processor, information regarding the identified task within the memory. A substitute task that performs a substitute program that corresponds to the identified task may be included in the program group and may be scheduled when the watchdog reset count reaches a predetermined maximum reset count after the controller is rebooted by being reset. The memory may be a non-volatile memory.

A plurality of watchdog channels for detection of errors within the controller may be included. The watchdog channels may include an internal watchdog channel and an external watchdog channel. A watchdog triggering interval and the watchdog timeout level may be adjusted for each watchdog channel. The external watchdog channel may include at least one of a digital input/output interface channel and a serial peripheral interface channel. Different fault response schemes may be defined and applied for each of the watchdog channels.

According to another exemplary embodiment of the present invention, an apparatus for controlling a watchdog included within a controller may include a watchdog device configured to initialize a watchdog count in response to a received trigger signal, a microprocessor (e.g., a processor) configured to transmit the trigger signal to the watchdog device by executing a watchdog task, determine whether to respond to a fault by comparing the watchdog count with a predetermined watchdog warning level, and restart the controller in response to a reset signal received from the watchdog device, and a memory configured to store watchdog reset information recorded by the microprocessor when the fault is to be responded to based on the determination of whether to respond and the recorded watchdog reset information being read when the controller is restarted.

In particular, the watchdog reset information may include at least one selected from the group consisting of: information regarding a program group related to the fault, information regarding a watchdog reset count that corresponds to the program group, and information regarding a task that incurs the fault in the program group. The microprocessor may be configured to exclude the program group from scheduling targets when the watchdog reset count reaches a predetermined maximum reset count. The microprocessor may include a substitute task configured to execute a substitute program that corresponds to the task that incurs the fault within the program group to schedule the substitute task when the watchdog reset count reaches the predetermined maximum reset count. The memory may be a non-volatile memory. The watchdog device may be configured to initialize the watchdog count in response to the received trigger signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is an exemplary watchdog reset information table according to an exemplary embodiment of the present invention;

DETAILED DESCRIPTION

Figure 1:
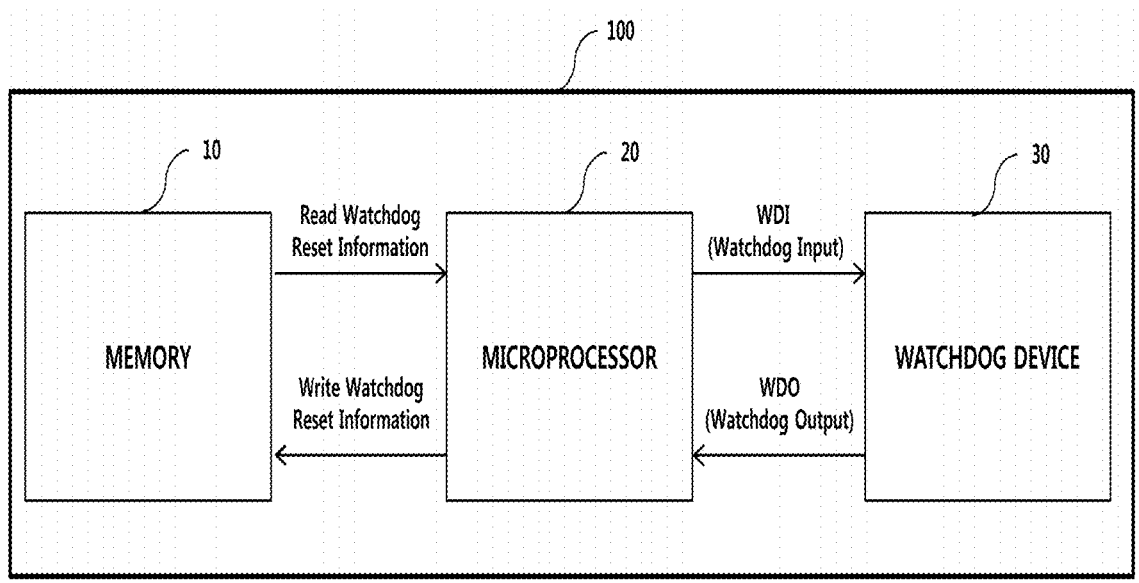
FIG. 1 is an exemplary block diagram illustrating a configuration of a watchdog controller according to an exemplary embodiment of the present invention.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. The suffixes "module" and "unit" of elements herein are used for convenience of description and thus can be used interchangeably and do not have any distinguishable meanings or functions.

It will be understood that, although the terms first, second, A, B, (a), (b), etc. may be used herein to describe various elements of the present invention, these terms are only used to distinguish one element from another element and essential, order, or sequence of corresponding elements are not limited by these terms. It will be understood that when one element is referred to as being "connected to", being "coupled to", or "accessing" another element, one element may be "connected to", "coupled to", or "access" another element via a further element although one element may be directly connected to or directly access another element.

FIG. 1 illustrates an exemplary configuration of a watchdog controller according to an exemplary embodiment of the present invention.

Referring to FIG. 1, the watchdog controller 100 may include a memory 10, a microprocessor 20 and a watchdog device 30. The memory 10 may be configured to store watchdog reset information. In particular, the watchdog reset information may include at least one selected from the group consisting of: information regarding a program group related to a fault, information regarding a watchdog reset count that corresponds to the program group, and information regarding a task incurring the fault in the program group. The memory 10 may be a non-volatile memory (e.g., a flash read only memory (ROM), an electrically erasable programmable read only memory (EEPROM), or the like).

The microprocessor 20 may be configured to periodically transmit a watchdog input (WDI) signal for clearing (e.g., initializing) a watchdog count to the watchdog device 30.

Hereinafter, the WDI signal is referred to as a trigger signal for convenience of description. A watchdog task periodically executed by the microprocessor 20 may be configured to generate the trigger signal and transmit the generated trigger signal to the watchdog device 30, which initializes the watchdog count to about 0. Accordingly, a controller may be prevented from being reset due to a watchdog timeout.

Upon receiving the trigger signal, the watchdog device 30 may be configured to initialize the watchdog count. When the trigger signal is not received, and thus the watchdog count exceeds a watchdog timeout level, a watchdog output (WDO) signal (e.g., a reset signal) may be generated and transmitted to the microprocessor 20. For example, when the task being executed by the microprocessor 20 enters an infinite loop, the watchdog task may not be executed and thus the trigger signal may not be generated.

The microprocessor 20 may be configured to detect whether a fault occurs by verifying whether the watchdog count exceeds (e.g., is greater than) a predetermined watchdog count clear level. In addition, when the watchdog count reaches a predetermined watchdog warning level after the fault is detected, the microprocessor 20 may be configured to perform a predetermined procedure that responds to the detected fault (hereinafter, referred to as a fault response procedure). In particular, the fault response procedure may refer to a procedure that stores the watchdog reset information, which may include information regarding a program group that incurs the fault, information regarding a watchdog reset count that indicates the number of resets incurred by the program group, and task information that identifies a task directly that results in the fault in an associated program, within the memory 10. In particular, the watchdog reset count may increase by about 1 each time a reset occurs based on the program group and be stored in the memory 10.

In addition, when the controller is rebooted based on the reset signal of the watchdog device 30, the microprocessor 20 may be configured to read the watchdog reset information from the memory 10 and compare the watchdog reset count with a predetermined maximum reset count. When the watchdog reset count reaches (e.g., is equal to) the predetermined maximum reset count, the program group may be excluded from scheduling targets.

As another example, when the watchdog reset count reaches the maximum reset count and is confirmed, the microprocessor 20 may be configured to remove the task that incurs the reset from the program group and add a substitute task that executes a safer program to the program group to perform scheduling. A scheme of excluding the program group from the scheduling targets and a scheme of substituting the task incurring the fault for a safe task may be predefined based on a safety strategy and used. A scheme of reconfiguring a scheduling table may be predefined and set based on a safety strategy for the controller.

As another example, the scheduling table reconfiguration scheme may be adaptively selected and performed based on watchdog channels. In particular, the watchdog channels may include an internal watchdog channel that monitors a watchdog included within the microprocessor 20 and an external watchdog channel that monitors a watchdog executed within an external element other than the microprocessor 20. A watchdog triggering interval and the watchdog timeout level may be set to different values for each watchdog channel. For example, the external watchdog channel may include a digital input/output interface channel, a serial peripheral interface channel, and the like.

Figure 2:
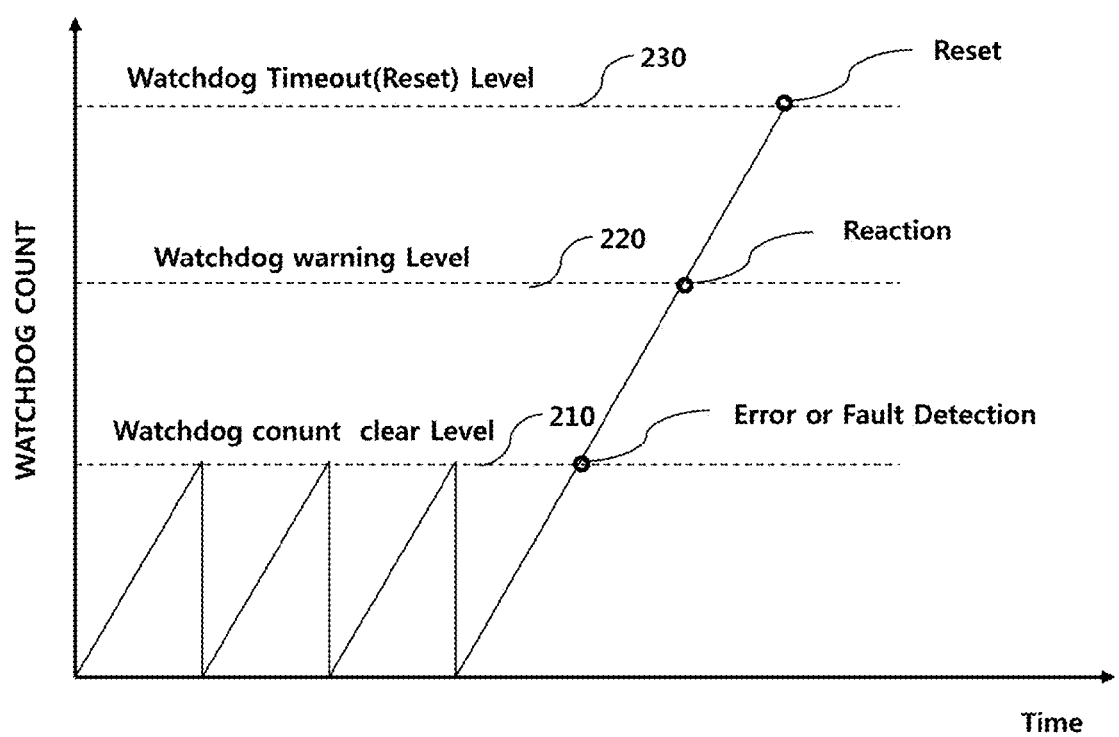
FIG. 2 is an exemplary graph illustrating a watchdog warning and a reset timing in response to detection of a fault according to an exemplary embodiment of the present invention.

FIG. 2 illustrates an exemplary watchdog warning and a reset timing in response to detection of the fault according to an exemplary embodiment of the present invention.

As illustrated in FIG. 2, the watchdog count may continuously increase over time and be initialized to about 0 when the trigger signal is detected. When the watchdog count is not initialized until the predetermined watchdog count clear level is exceeded, the fault may be detected. When the watchdog count continuously increases to reach the predetermined watchdog count clear level after the fault is detected, a watchdog controller 100 may be configured to start a fault response procedure. Thereafter, when the watchdog count continuously increases to reach the predetermined watchdog timeout level, the reset signal may be detected and a rebooting procedure of the controller may be executed.

Figure 3:
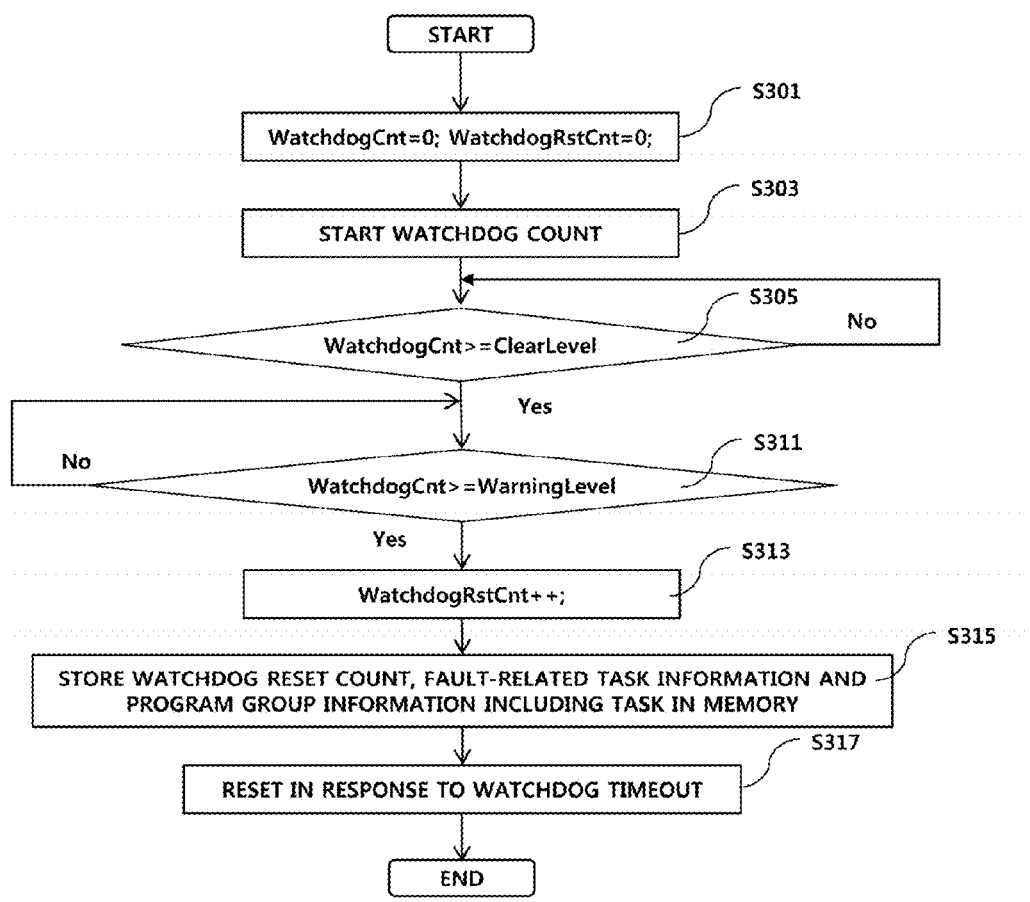
FIG. 3 is an exemplary flowchart illustrating a method of controlling a watchdog within the watchdog controller according to an exemplary embodiment of the present invention.

FIG. 3 illustrates an exemplary method of controlling the watchdog in the watchdog controller according to an exemplary embodiment of the present invention.

Referring to FIG. 3, when the controller is operated for the first time, the watchdog controller 100 may be configured to initialize each of the watchdog count (WatchdogCnt) and the watchdog reset count (WatchdogRstCnt) to about 0 S301 and increase the watchdog count (e.g., a watchdog timer value) S303. Thereafter, the watchdog controller 100 may be configured to verify whether the watchdog count (WatchdogCnt) is greater than or equal to the watchdog count clear level (ClearLevel) S305.

When the watchdog count (WatchdogCnt) is verified to be greater than or equal to the watchdog count clear level (ClearLevel), in other words, when occurrence of a fault or a defect is detected from the controller, the watchdog controller 100 may be configured to verify whether the watchdog count (WatchdogCnt) is greater than or equal to the watchdog warning level (WarningLevel) S311.

When the watchdog count (WatchdogCnt) is verified to be greater than or equal to the watchdog warning level (WarningLevel), the watchdog controller 100 may be configured to increase the watchdog reset count (WatchdogRstCnt) by about 1 S313 and store the watchdog reset information in the memory S315. When the reset signal is detected based on the watchdog timeout, the watchdog controller 100 may be configured to restart the rebooting procedure S317.

Figure 4:
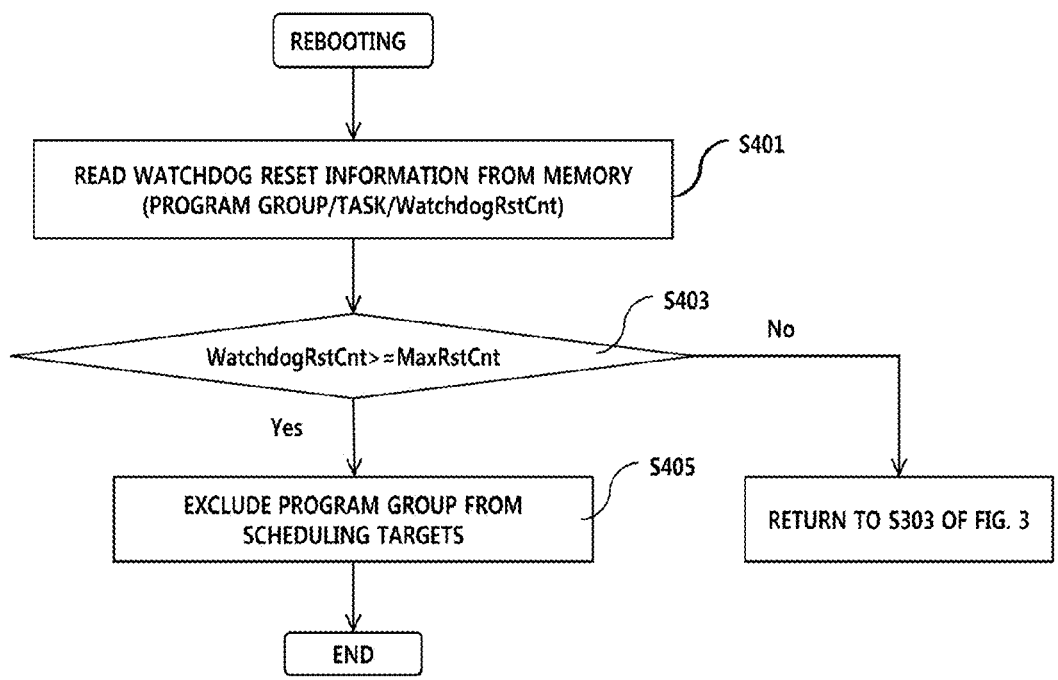
FIG. 4 is an exemplary flowchart illustrating a method of controlling a watchdog in response to rebooting according to an exemplary embodiment of the present invention.

FIG. 4 illustrates an exemplary method of controlling the watchdog in response to the rebooting according to an exemplary embodiment of the present invention.

When the rebooting by the reset signal of FIG. 3 is completed, the watchdog controller 100 may be configured to read the watchdog reset information stored within the memory 10 S401. Further, the watchdog controller 100 may be configured to verify whether the watchdog reset count is greater than or equal to the predetermined maximum reset count S403.

When the watchdog reset count is verified to be greater than or equal to the predetermined maximum reset count, the watchdog controller 100 may be configured to reconfigure the scheduling table by excluding the program group from the scheduling targets S405. When the watchdog reset count is less than the predetermined maximum reset count, the watchdog controller 100 may be configured to increase the watchdog count (e.g., a watchdog timer value).

Figure 5:
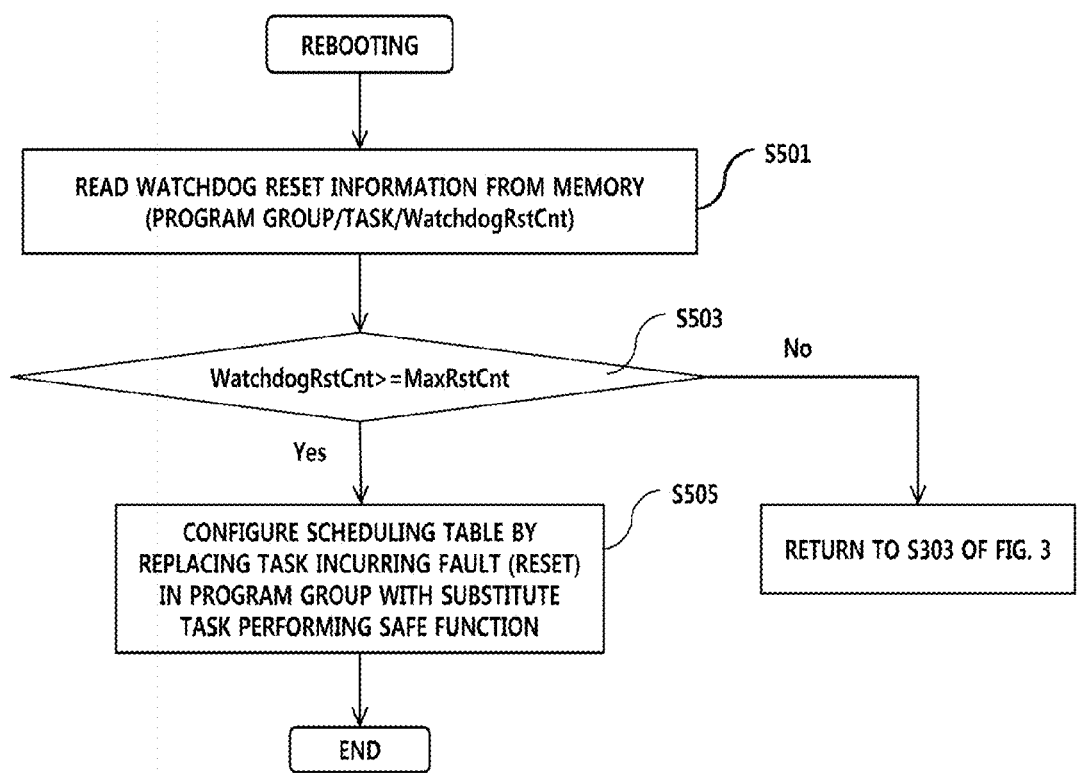
FIG. 5 is an exemplary flowchart illustrating a method of controlling a watchdog in response to rebooting according to an exemplary embodiment of the present invention.

FIG. 5 illustrates an exemplary method of controlling the watchdog in response to the rebooting according to an exemplary embodiment of the present invention. When the rebooting by the reset signal of FIG. 3 is completed, the watchdog controller 100 may be configured to read the watchdog reset information stored within the memory 10 S501. Further, the watchdog controller 100 may be configured to verify whether the watchdog reset count is greater than or equal to the predetermined maximum reset count S503.

When the watchdog reset count is verified to be greater than or equal to the predetermined maximum reset count, the watchdog controller 100 may be configured to exclude the task that incurs the fault in the program group from the program group and reconfigure the scheduling table by adding the substitute task designated in advance to the program group S505. When the watchdog reset count is less than the predetermined maximum reset count in S503, the watchdog controller 100 may be configured to increase the watchdog count (e.g., a watchdog timer value).

FIG. 6 illustrates an exemplary watchdog reset information table according to an exemplary embodiment of the present invention.

Referring to FIG. 6, the watchdog reset information table 600 may include a program group field 601, a task field 603, a watchdog reset count field 605, and the like. Group identification information of programs executed within the controller may be recorded in the program group field 601. Task identification information that identifies the task that incurs the fault among tasks included in the program group may be recorded in the task field 603.

A total number of resets occurring due to the program group may be recorded in the watchdog reset count field 605. For example, FIG. 6 shows that a fault incurred by task 6 of group B and a total number of resets by group B may be about 4. In addition, resets may not be incurred by remaining group A and group C. When the number of resets by group B reaches a maximum number of resets, the watchdog controller 100 may be configured to replace task 6 with safer task 6*. Accordingly, values of the task field 603 and the watchdog reset count field 605 of group B recorded in the watchdog reset information table 600 may be initialized to none and about 0, respectively.

Figure 7:
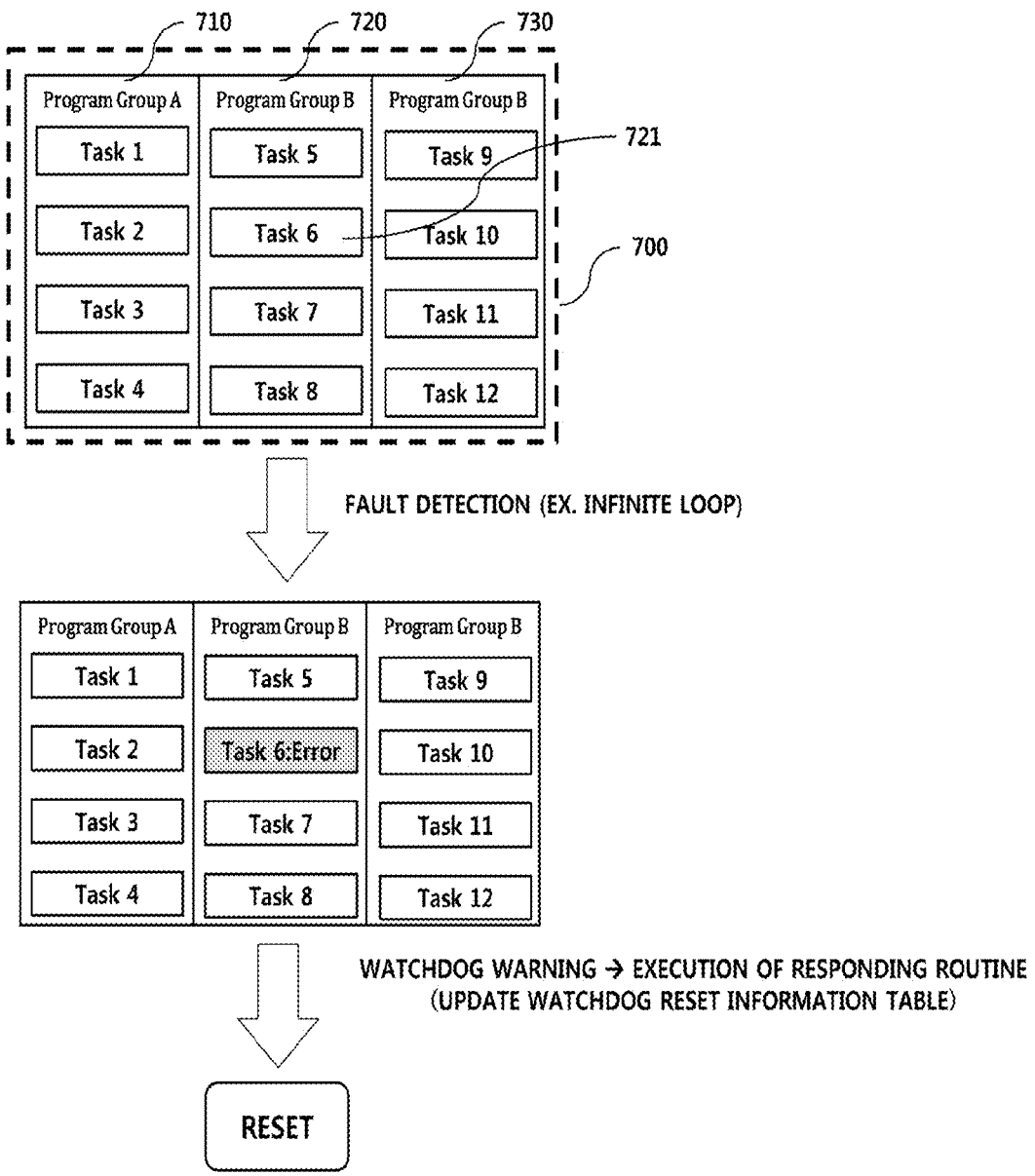
FIG. 7 is an exemplary conceptual diagram illustrating a watchdog control procedure according to an exemplary embodiment of the present invention.

FIG. 7 illustrates an exemplary watchdog control procedure according to an exemplary embodiment of the present invention.

Referring to FIG. 7, program group A 710, program group B 720 and program group C 703 may be included in an initial scheduling table 700 of the controller as scheduling targets. When a fault incurred by task 6 721 included in program group B 720 is detected during execution of the controller, the watchdog controller 100 may be configured to update the watchdog reset information table 600 stored in the memory 10 before the reset. The watchdog controller 100 may be configured to record information regarding task 6 in a task field that corresponds to program group B 720 and increase a watchdog reset count that corresponds to program group B 720 by about 1.

Figure 8:
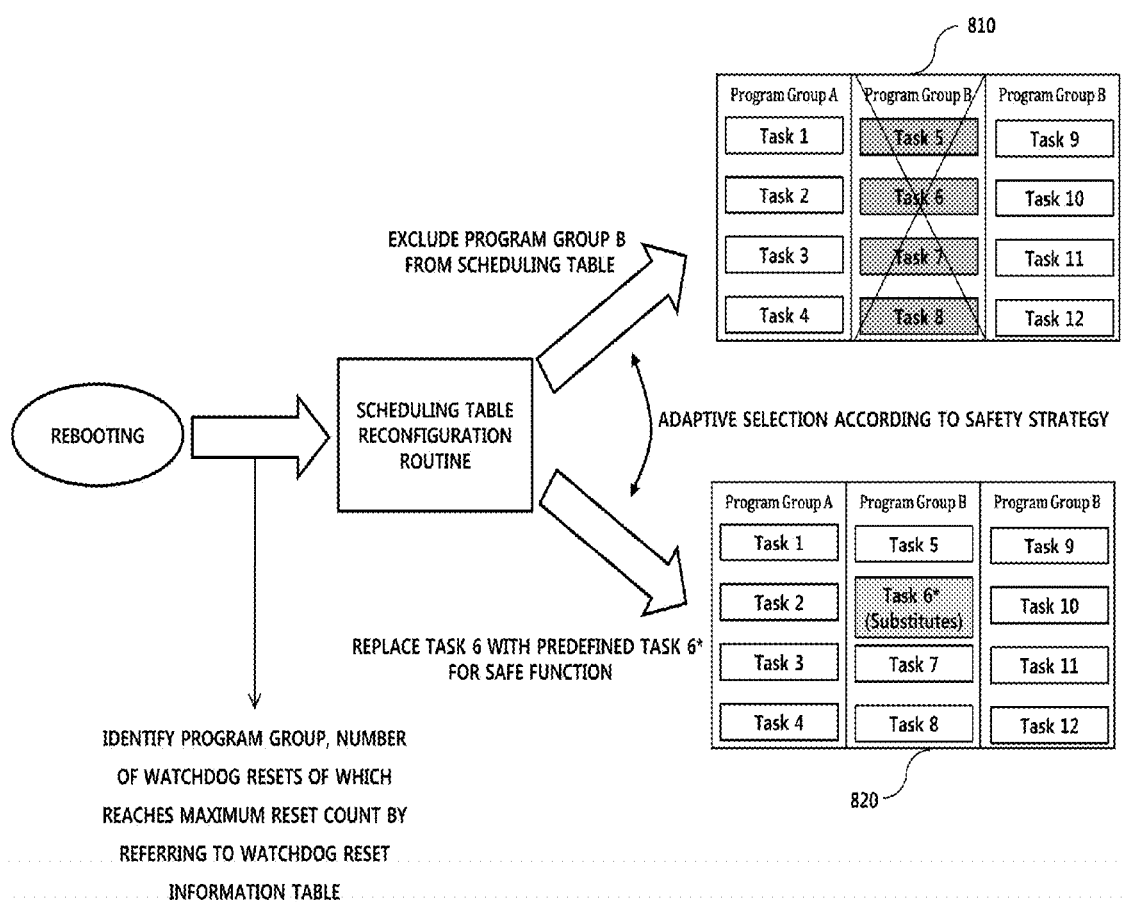
FIG. 8 is an exemplary conceptual diagram illustrating a watchdog control procedure during rebooting according to an exemplary embodiment of the present invention.

FIG. 8 illustrates an exemplary watchdog control procedure during rebooting according to an exemplary embodiment of the present invention.

Referring to FIG. 8, when the controller is rebooted by the reset signal, the watchdog controller 100 may be configured to verify whether there is a program group and the watchdog reset count of the program group reaches the predetermined maximum reset count by referring to the watchdog reset information table 600 within the memory 10. Thereafter, the watchdog controller 100 may be configured to reconfigure the scheduling table based on a result of the verification.

As an example, when the watchdog reset count that corresponds to program group B is verified to have reached the maximum reset count, the watchdog controller 100 may be configured to delete information regarding program group B from the scheduling table 810.

As another example, when the watchdog reset count that corresponds to program group B is verified to reach the maximum reset count, the watchdog controller 100 may be configured to reconfigure the scheduling table by replacing task 6 that incurs the fault among the tasks in program group B with task 6* that is designated in advance 820.

Figure 9:
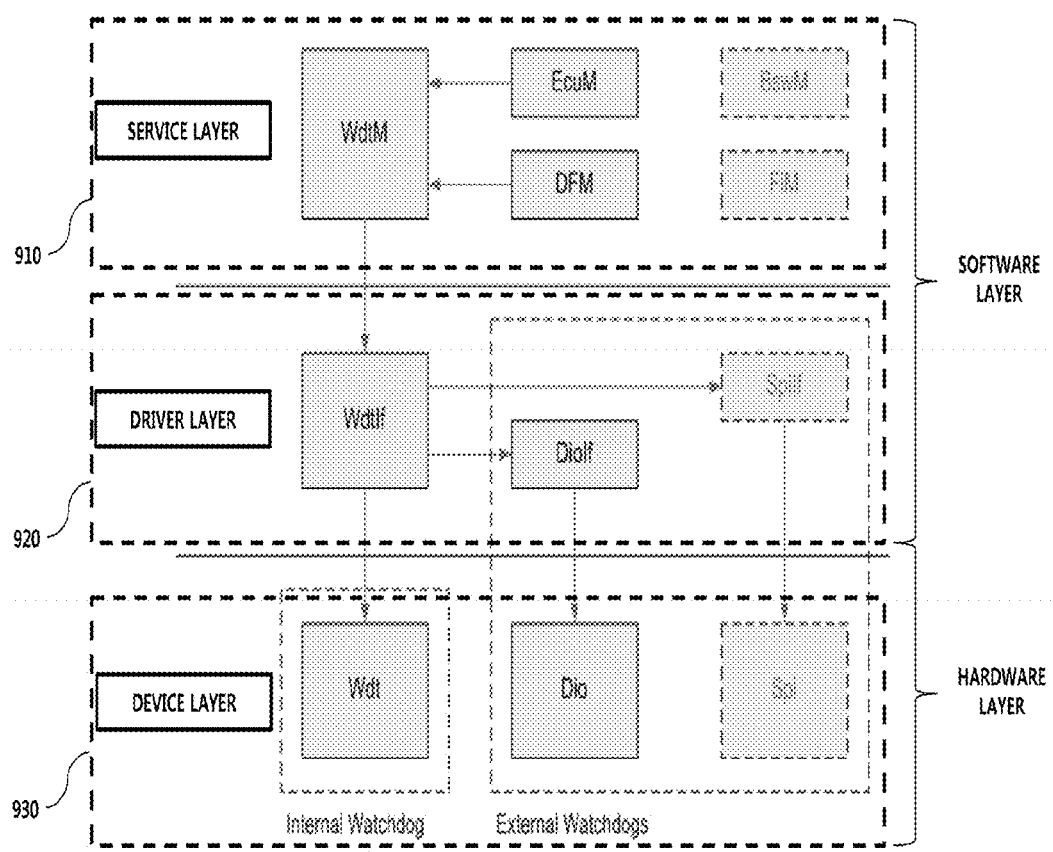
FIG. 9 is an exemplary block diagram illustrating a layer structure of the watchdog controller according to an exemplary embodiment of the present invention.

FIG. 9 illustrates an exemplary layer structure of the watchdog controller 100 according to an exemplary embodiment of the present invention.

Referring to FIG. 9, the layer structure of the watchdog controller 100 may include a service layer 910 that corresponds to an uppermost layer, a driver layer 920 that provides an interface between the uppermost layer and a lowermost layer and a device layer 930 that corresponds to the lowermost layer. The service layer 910 may be configured to perform the fault response procedure by setting a characteristic for each watchdog channel and monitoring a state of a watchdog count for each watchdog channel. For example, the service layer 910 may be configured to verify whether the watchdog count reaches the watchdog warning level by periodically scheduling a watchdog management task and store the watchdog reset information within the non-volatile memory 10 when the watchdog count is verified to exceed (e.g., is greater than) the watchdog warning level.

In addition, the service layer 910 may be configured to perform a function of reconfiguring the scheduling table by referring to the watchdog reset information table 600 stored within the memory 10. Moreover, the service layer 910 may be configured to provide a user interface environment for defining a scheme of reconfiguring the scheduling table for each watchdog channel. The driver layer 920 may be configured to define watchdog channels and provide an interface environment common to many watchdog channels to the service layer 910. For example, the watchdog channels may include an internal watchdog channel and an external watchdog channel. In particular, the external watchdog channel may include a digital input/output interface channel, a serial peripheral interface channel, and the like. The driver layer 920 may be configured to execute a trigger signal for each watchdog channel or watchdog device.

The driver layer 920 may also be configured to perform a control operation to deliver the trigger signal to the device layer 930 by executing the watchdog task at predefined intervals. In addition, the driver layer 920 may be configured to transmit, to the service layer 920, a predetermined notification signal that indicates the trigger signal is successfully transmitted. In particular, the service layer 910 may be configured to initialize the internal watchdog count.

The device layer 930 may be configured to initialize the watchdog count based on the trigger signal received from the driver layer 920, generate a reset signal, and transmit the generated reset signal to an upper layer when watchdog timeout occurs since the trigger signal is not received. The watchdog management task executed by the service layer 910 and the watchdog task executed by the driver layer 920 may be scheduled using different interruption sources. For example, the service layer 910 may perform rapid task scheduling using a general pulse width modulation timer interruption and the driver layer 920 may perform task scheduling using a system timer interruption. In particular, the watchdog management task may be set to a top priority to perform a control operation to prevent the watchdog management task from being affected by another general program and another interruption.

Figure 10:
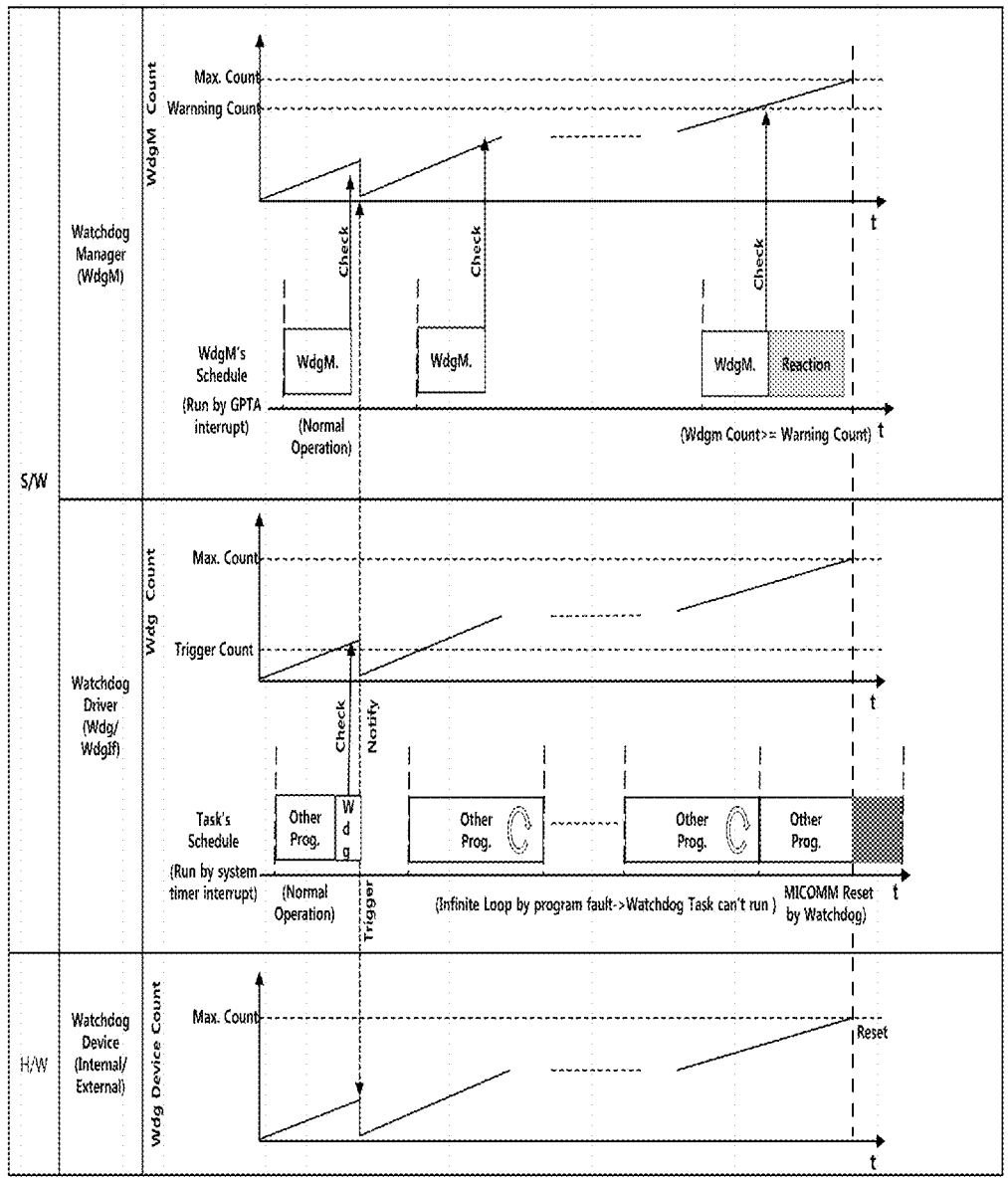
FIG. 10 is an exemplary diagram illustrating a watchdog control timing in the watchdog controller according to an exemplary embodiment of the present invention.

FIG. 10 illustrates an exemplary watchdog control timing in the watchdog controller 100 according to an exemplary embodiment of the present invention.

Referring to FIG. 10, a watchdog task of a watchdog driver may be executed at the end of another program task to respond to occurrence of a fault of another program task. The watchdog task may be configured to transmit a notification signal to a watchdog manager simultaneously (e.g., at the same time) as transmitting the trigger signal to the watchdog device. When the trigger signal is detected, the watchdog device may be configured to reset the watchdog count. In addition, when a watchdog manager notification signal is received, the internal watchdog count may be initialized.

When an infinite loop is generated due to a fault of another program, the watchdog task may not be executed. Accordingly, the trigger signal and the notification signal may not be transmitted to the watchdog device and the watchdog manager, respectively. The watchdog manager may be configured to execute the fault response procedure when the watchdog count continuously reaches the watchdog warning level. Further, the watchdog driver may be configured to generate the reset signal in response to the watchdog timeout and transmit the generated reset signal to the watchdog manager. In addition, the watchdog manager may be configured to execute the rebooting procedure of the controller based on the received reset signal.

Effects of a method and an apparatus according to the present invention are described below.

First, the present invention may provide a safer method of controlling a watchdog and an apparatus for the same.

Second, the present invention may provide a method of controlling a watchdog capable of more safely preventing occurrence of repeated resets and an apparatus for the same by recording information about a program group that incurs a fault and the number of resets incurred by the program group in a non-volatile memory and excluding the program group from scheduling targets based on the number of resets during system restart when the system restart is required due to expiration of a watchdog timer.

Third, the present invention may provide a method of controlling a watchdog capable of preventing occurrence of repeated resets resulting from a similar cause and an apparatus for the same by recording task identification information for identifying a task that incurs a fault in a non-volatile memory and loading a substitute program that corresponds to the recorded task identification information during system restart when the system restart is required due to expiration of a watchdog timer.

Effects that may be obtained from the present invention are not limited to the above-mentioned effects, and other effects not mentioned may be clearly understood by those skilled in the art from the above description. Those skilled in the art will appreciate that exemplary embodiments of the present invention may be carried out in other specific ways than those set forth herein without departing from the spirit and essential characteristics of the present invention.

The exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method of controlling a watchdog in a controller, comprising:
   determining, by a processor, whether to respond to a fault in the controller by comparing a watchdog count with a predetermined watchdog warning level when the fault is detected;
   recording, by the processor, information regarding a program group related to the detected fault and a watchdog reset count that corresponds to the program group in a memory after increasing the watchdog reset count when the fault is to be responded to; and
   resetting, by the processor, the controller when the watchdog count exceeds a predetermined watchdog timeout level.

2. The method according to claim 1, further comprising:
   excluding, by the processor, the program group from scheduling targets when the watchdog reset count reaches a predetermined maximum reset count.

3. The method according to claim 1, further comprising:
   detecting, by the processor, the fault when the watchdog count exceeds a predetermined watchdog count clear level.

4. The method according to claim 1, further comprising:
   identifying, by the processor, a task that incurs the fault in the program group: and
   storing, by the processor, information regarding the identified task within the memory.

5. The method according to claim 4, further comprising:
   including, by the processor, a substitute task that performs a substitute program that corresponds to the identified task in the program group; and
   scheduling, by the processor, the substitute task when the watchdog reset count reaches a predetermined maximum reset count after the controller is rebooted by being reset.

6. The method according to claim 1, wherein the memory is a non-volatile memory.

7. The method according to claim 1, wherein the controller includes a plurality of watchdog channels that detect errors.

8. The method according to claim 7, wherein the plurality of watchdog channels include an internal watchdog channel and an external watchdog channel.

9. The method according to claim 7, wherein a watchdog triggering interval and the watchdog timeout level are adjusted for each watchdog channel.

10. The method according to claim 7, wherein the external watchdog channel includes at least one of a digital input/output interface channel and a serial peripheral interface channel.

11. The method according to claim 7, further comprising:
    defining, by the processor, different fault response schemes for the plurality of watchdog channels; and
    applying, by the processor, the different fault response schemes for the plurality of watchdog channels.

12. An apparatus for controlling a watchdog included in a controller, comprising:
    a watchdog device configured to initialize a watchdog count in response to a received trigger signal;
    a microprocessor configured to:
       transmit the trigger signal to the watchdog device by executing a watchdog task;
       determine whether to respond to a fault by comparing the watchdog count with a predetermined watchdog warning level; and
       restart the controller in response to a reset signal received from the watchdog device; and
    a memory configured to store watchdog reset information, which is read when the controller is restarted, recorded by the microprocessor when the fault is to be responded to as a result of the determination.

13. The apparatus according to claim 12, wherein the watchdog reset information includes at least one selected from the group consisting of: information regarding a program group related to the fault, information regarding a watchdog reset count that corresponds to the program group, and information regarding a task that incurs the fault in the program group.

14. The apparatus according to claim 13, wherein the microprocessor is further configured to:
   exclude the program group from scheduling targets when the watchdog reset count reaches a predetermined maximum reset count.

15. The apparatus according to claim 13, wherein the microprocessor is further configured to:
   execute a substitute program that corresponds to the task that incurs the fault in the program group; and
   schedule the substitute task when the watchdog reset count reaches a predetermined maximum reset count.

16. The apparatus according to claim 12, wherein the memory is a non-volatile memory.

17. The apparatus according to claim 12, wherein the watchdog device is configured to initialize the watchdog count in response to the received trigger signal.

18. A non-transitory computer readable medium containing program instructions executed by a processor, the computer readable medium comprising:
   program instructions that determine whether to respond to a fault within a controller by comparing a watchdog count with a predetermined watchdog warning level when the fault is detected;
   program instructions that record information regarding a program group related to the detected fault and a watchdog reset count that corresponds to the program group in a memory after increasing the watchdog reset count when the fault is to be responded to; and
   program instructions that reset the controller when the watchdog count exceeds a predetermined watchdog timeout level.

19. The non-transitory computer readable medium of claim 18, further comprising:
   program instructions that exclude the program group from scheduling targets when the watchdog reset count reaches a predetermined maximum reset count.

20. The non-transitory computer readable medium of claim 18, further comprising:
   program instructions that detect the fault when the watchdog count exceeds a predetermined watchdog count clear level.

\* \* \* \* \*